(12) United States Patent
Lee et al.

(10) Patent No.: US 9,002,999 B2
(45) Date of Patent: Apr. 7, 2015

(54) MOBILE PEER-TO-PEER BASED NETWORK APPARATUS AND SYSTEM

(75) Inventors: Ji Hoon Lee, Anyang-si (KR); Myeong Wuk Jang, Seoul (KR); Jae Hoon Kim, Yongin-si (KR); Joong-Hong Park, Seoul (KR); Sung-Chan Choi, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 758 days.

(21) Appl. No.: 12/895,325

(22) Filed: Sep. 30, 2010

(65) Prior Publication Data

US 2011/0093600 A1  Apr. 21, 2011

(30) Foreign Application Priority Data

Oct. 21, 2009  (KR) .................. 10-2009-0100185

(51) Int. Cl.
| | | |
|---|---|---|
| G06F 15/177 | (2006.01) | |
| G06F 15/173 | (2006.01) | |
| G06F 15/16 | (2006.01) | |
| H04W 48/18 | (2009.01) | |
| H04L 29/08 | (2006.01) | |
| H04W 36/00 | (2009.01) | |
| H04W 76/04 | (2009.01) | |
| H04W 84/18 | (2009.01) | |
| H04W 88/18 | (2009.01) | |

(52) U.S. Cl.
CPC ........... *H04W 48/18* (2013.01); *H04L 67/1036* (2013.01); *H04L 67/1002* (2013.01); *H04L 67/148* (2013.01); *H04W 36/0011* (2013.01); *H04W 76/041* (2013.01); *H04W 84/18* (2013.01); *H04W 88/182* (2013.01); *H04L 67/104* (2013.01); *H04L 67/14* (2013.01); *H04L 67/28* (2013.01); *H04L 67/1078* (2013.01)

(58) Field of Classification Search
CPC . H04W 48/18; H04W 36/0011; H04W 84/18; H04W 76/041; H04W 88/182; H04L 67/148; H04L 67/1002; H04L 67/1036; H04L 67/14; H04L 67/1078; H04L 67/28; H04L 67/104
USPC .................. 709/220, 221, 223, 226, 227–228
See application file for complete search history.

(56) References Cited

U.S. PATENT DOCUMENTS

| | | | |
|---|---|---|---|
| 6,601,101 B1 * | 7/2003 | Lee et al. .................. | 709/227 |
| 6,826,613 B1 * | 11/2004 | Wang et al. ................ | 709/227 |
| 6,912,588 B1 * | 6/2005 | Jardin et al. ............... | 709/238 |

(Continued)

FOREIGN PATENT DOCUMENTS

| | | |
|---|---|---|
| EP | 2 015 542 | 1/2009 |
| EP | 2 026 618 | 2/2009 |

(Continued)

OTHER PUBLICATIONS

RFC4140, Request for Comments:4140, "Hierarchical Mobile IPv6 Mobility Management (HMIPv6)", Aug. 2005, Soliman et al.*

(Continued)

*Primary Examiner* — Edward Kim
(74) *Attorney, Agent, or Firm* — NSIP Law

(57) ABSTRACT

A Peer-to-Peer (P2P)-based network apparatus and system is provided. The P2P-based network apparatus may sense the movement of a mobile station (MS), select a candidate proxy, and change a proxy of the MS to the candidate proxy.

22 Claims, 7 Drawing Sheets

(56) References Cited

U.S. PATENT DOCUMENTS

| | | |
|---|---|---|
| 7,689,710 B2 * | 3/2010 | Tang et al. .................... 709/237 |
| 2002/0010771 A1 * | 1/2002 | Mandato ....................... 709/223 |
| 2002/0188753 A1 * | 12/2002 | Tang et al. .................... 709/237 |
| 2003/0005034 A1 * | 1/2003 | Amin ............................ 709/202 |
| 2003/0145038 A1 * | 7/2003 | Bin Tariq et al. ............. 709/202 |
| 2004/0228343 A1 * | 11/2004 | Molteni et al. ................ 370/392 |
| 2007/0230468 A1 | 10/2007 | Narayanan et al. |
| 2008/0198805 A1 * | 8/2008 | Weniger et al. ............... 370/331 |
| 2009/0046660 A1 | 2/2009 | Casati et al. |
| 2009/0201855 A1 * | 8/2009 | Weniger et al. ............... 370/328 |
| 2009/0222530 A1 * | 9/2009 | Buford et al. ................. 709/217 |

FOREIGN PATENT DOCUMENTS

| | | |
|---|---|---|
| JP | 2009-104377 | 5/2009 |
| KR | 10-2006-0003900 | 1/2006 |
| KR | 10-2006-0010071 | 2/2006 |
| KR | 10-2006-0098040 | 9/2006 |
| WO | WO 2007/030723 | 3/2007 |

OTHER PUBLICATIONS

Huan et al., "Location-aware multimedia proxy handoff over the IPv6 mobile network environment", Aug. 2006, Journal of Systems and Software, vol. 79 isue 8, p. 1037-1050.*

European Search Report issued on Dec. 13, 2010, in corresponding European Patent Application No. 10186850.3 (7 pages).

* cited by examiner

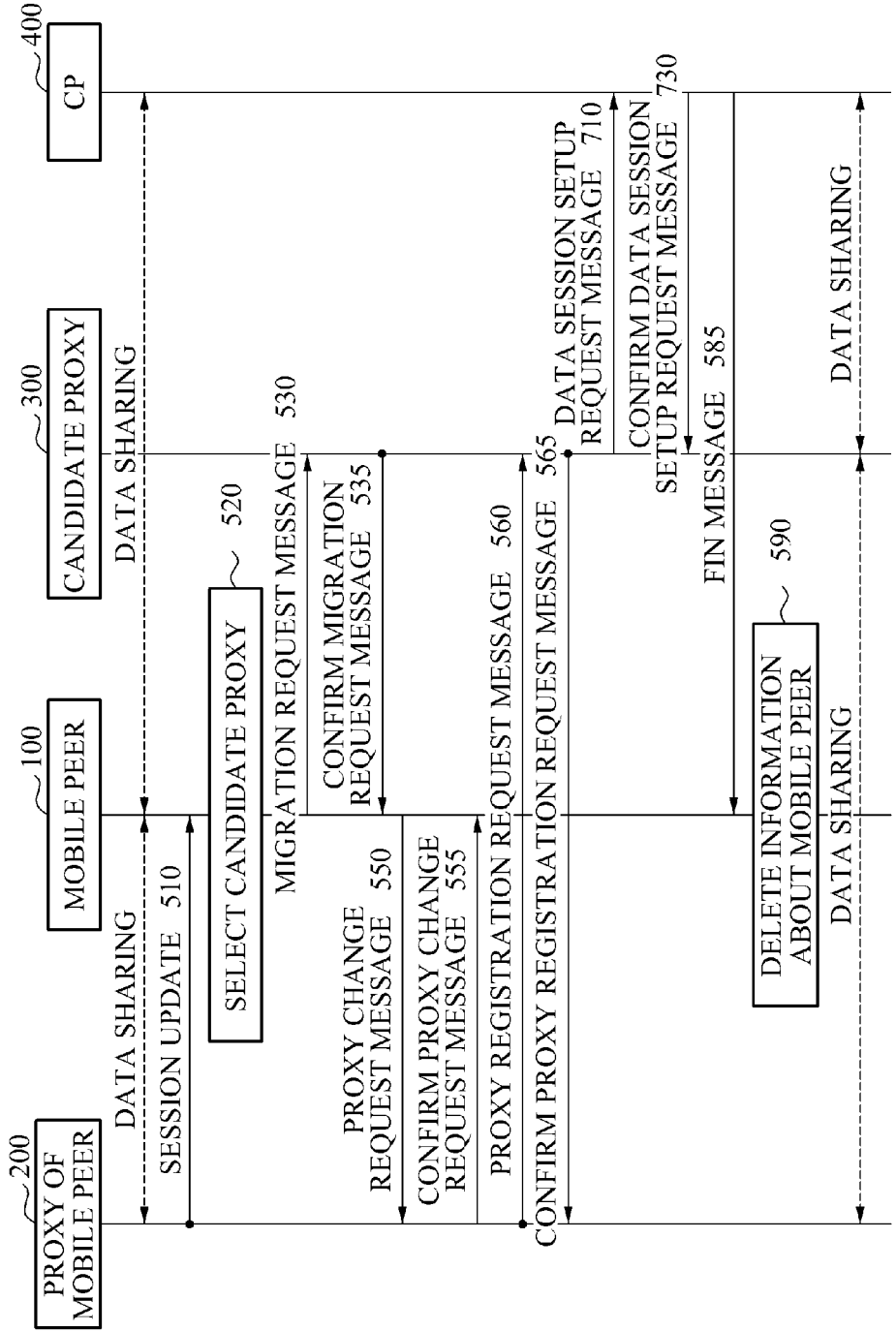

MOBILE PEER-TO-PEER BASED NETWORK APPARATUS AND SYSTEM

CROSS-REFERENCE TO RELATED APPLICATION(S)

This application claims the benefit under 35 U.S.C. §119 (a) of Korean Patent Application No. 10-2009-0100185, filed Oct. 21, 2009, in the Korean Intellectual Property Office, the entire disclosure of which is incorporated herein by reference for all purposes.

BACKGROUND

1. Field

The following description relates to a network apparatus and system, and more particularly, to an apparatus and system that may change a proxy in a mobile Peer-to-Peer (P2P)-based network.

2. Description of the Related Art

A Peer-to-Peer (P2P) technology may be applied to an existing client-server model. The P2P technology enables a server to process data and to share computing resources of a server, system resources, and the like, with a client.

For example, a P2P technology may be configured to enable information to be shared among peers without being dependent on a predetermined server. Accordingly, an additional cost generated when an existing client-server model is operated may be reduced.

However, a peer may move in a P2P-based network model. Each time a peer moves service disruption may occur. Accordingly, research on a mobile P2P technology is currently being conducted to reduce the number and length of service disruptions that occur when a peer moves throughout a P2P network.

SUMMARY

In one general aspect, there is provided a Peer-to-Peer (P2P)-based network apparatus, the apparatus including a movement sensing unit to sense movement of a mobile station (MS), a candidate proxy selection unit to select a candidate proxy for connection with the MS, in response to movement of the MS being sensed, a data packet forwarding unit to forward a data packet destined for the MS to the selected candidate proxy, and an information control unit to delete information about the MS after the data packet is forwarded.

The movement sensing unit may sense the movement of the MS based on the location of the MS.

The movement sensing unit may sense the movement of the MS based on at least one of a change of an Internet Protocol (IP) address of the MS, a change of a network interface, and whether a handover occurs.

The candidate proxy selection unit may determine whether to change a proxy of the MS, and when a proxy change is determined, may select the candidate proxy based on state information of each of a plurality of neighbor proxies.

The data packet forwarding unit may forward a migration request message to the candidate proxy, may set a tunnel with the candidate proxy, and may forward the data packet to the candidate proxy.

When a confirm migration request message is received from the candidate proxy, the data packet forwarding unit may forward address information of the candidate proxy to the MS.

The data packet forwarding unit may forward a proxy change request message to the MS, and a data session between the MS and the candidate proxy may be set through the forwarding of the proxy change request message.

When the data session between the MS and the candidate proxy is set, the data packet forwarding unit may forward a data packet that was previously forwarded to the candidate proxy, to the MS.

The P2P-based network apparatus may further include a message forwarding unit to forward an endpoint change request message to at least one Correspondent Peer (CP) connected to the MS when the data session between the MS and the candidate proxy is set.

The data packet forwarding unit may receive and forward the data packet from and to the MS and at least one CP connected to the MS, and may share the data packet with the MS and the at least one CP.

In another aspect, there is provided a P2P-based network apparatus, the apparatus including a data packet receiving unit to receive a data packet from a proxy that senses movement of an MS and that determines a proxy change of the MS, a packet buffering unit to buffer the received data packet, a message receiving unit to receive a proxy registration request message from the MS, and a data packet forwarding unit to forward the buffered data packet to the MS, when the MS is registered.

The message receiving unit may receive a migration request message from the proxy that determines the proxy change, and the migration request message may include information about the MS and a CP list.

The data packet receiving unit may forward the buffered data packet to the MS, and may share the data packet with the MS and at least one CP connected to the MS.

In another aspect, there is provided a P2P-based network apparatus, the apparatus including a message receiving unit to receive a proxy change request message from a proxy that determines a proxy change of an MS and that selects a candidate proxy, a registration setting unit to set a registration of the P2P-based network apparatus in the selected candidate proxy, and a data packet receiving unit to receive a data packet, buffered in the selected candidate proxy, when the registration is set.

The P2P-based network apparatus may further include an information forwarding unit to forward information to the proxy determining the proxy change, wherein the information is used to sense movement of the MS.

The information may include at least one of a change of an IP address of the MS, a change of a network interface, and whether a handover occurs.

The registration setting unit may receive the proxy change request message, forward a proxy registration request message to the selected candidate proxy, and set the registration in the candidate proxy.

In another aspect, there is provided a P2P-based network apparatus, the apparatus including a message receiving unit to receive a migration request message from a proxy and a proxy registration request message from an MS, wherein the proxy senses movement of the MS and determining a proxy change of the MS, and a session setting unit to set a data session with at least one CP connected to the MS, when the MS is registered.

The P2P-based network apparatus may further include a data packet receiving unit to share a data packet with the at least one CP and the MS, when the data session with the at least one CP is set.

In another aspect, there is provided a P2P-based network system, the system including an MS, a proxy to sense movement of the MS, to determine whether to change a proxy of the MS, and when the proxy change of the MS is determined, to select a candidate proxy, the candidate proxy to buffer a data packet, forwarded from the proxy, and when the MS is registered, to forward the buffered data packet to the MS, and a CP to terminate a data session with the proxy and to share the data packet with the candidate proxy, when an endpoint change request message is received from the proxy.

Other features and aspects may be apparent from the following description, the drawings, and the claims.

BRIEF DESCRIPTION OF THE DRAWINGS

FIG. 7 is a diagram illustrating an example process of setting a data session among a candidate proxy and a correspondent peer.

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the apparatuses, methods, and/or systems described herein. Accordingly, various changes, modifications, and equivalents of the apparatuses, methods, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
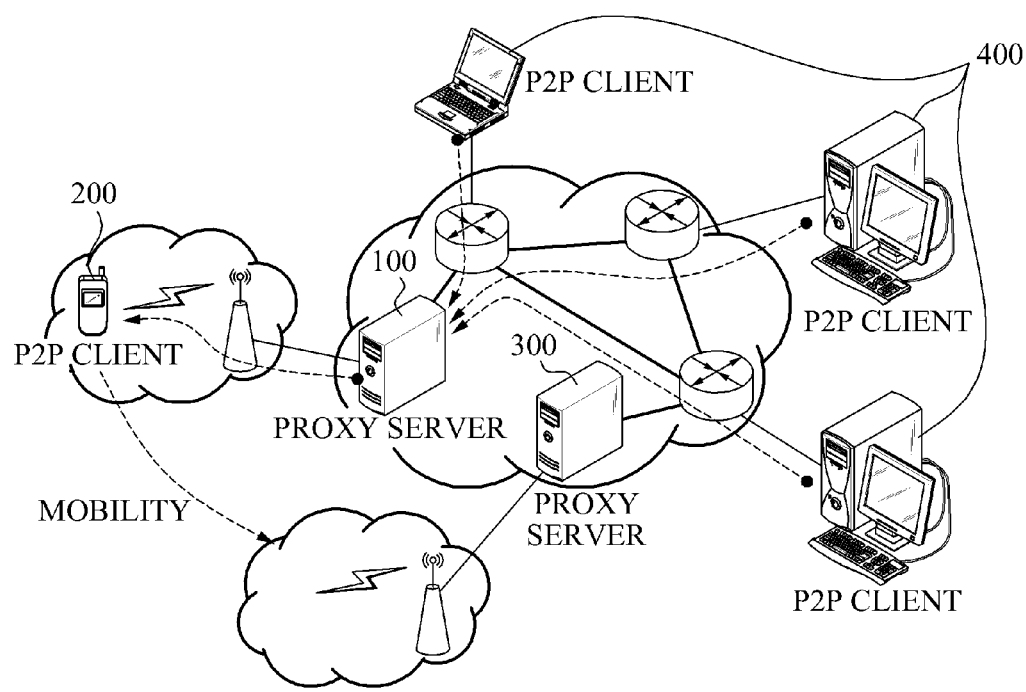
FIG. 1 is a diagram illustrating an example of a mobile Peer-to-Peer (P2P)-based network system.

FIG. 1 illustrates an example of a mobile Peer-to-Peer (P2P)-based network system.

Referring to the example in FIG. 1, the network system includes a proxy 100, a mobile peer 200, a neighbor proxy 300, and correspondent peers (CPs) 400. A data session may be set between the proxy 100 and the mobile peer 200. Accordingly, the proxy 100 may forward data packets, received from one or more of the CPs 400, to the mobile peer 200.

The proxy 100 may sense movement of the mobile peer 200, and determine whether to change a proxy of the mobile peer 200. For example, the proxy 100 may include a proxy node, a proxy server, a proxy agent, and the like.

Accordingly, the proxy 100 may determine one of the neighbor proxies 300 as a candidate proxy for the mobile peer 200 to be transferred to, based on a location of the mobile peer 200. The candidate proxy may receive data packets for the mobile peer 200 from the proxy 100, and perform buffering. For example, the proxy 100 may tunnel data packets for the mobile peer 200 to the candidate proxy. If necessary, the candidate proxy may hold or buffer the data packets until the mobile peer 200 is capable of receiving the data packets. The data packets may be data packets forwarded to the proxy 100 from the CPs 400 connected to the mobile peer 200.

The mobile peer 200 may forward information about the movement of the mobile peer 200 to the proxy 100. Accordingly, the proxy 100 may sense the movement of the mobile peer 200 based on, for example, an Internet Protocol (IP) address change of the mobile peer 200, a network interface change, whether a handover occurs, and the like. In some embodiments, the mobile peer 200 and the proxy 100 may belong to different networks.

A method for changing a proxy by sensing movement of the mobile peer 200 is described with reference to FIG. 2.

Figure 2:
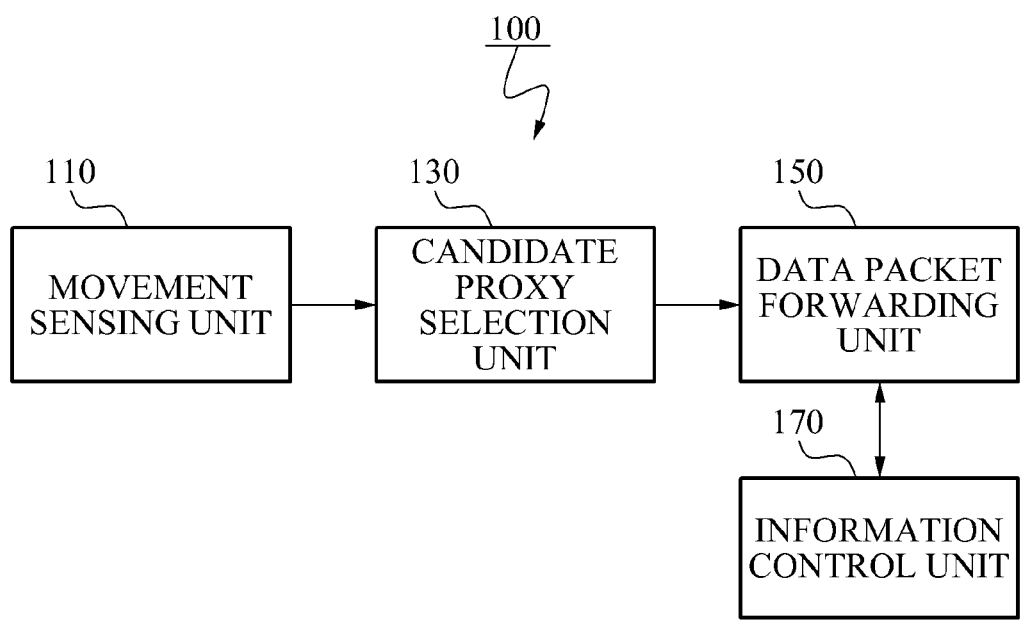
FIG. 2 is a diagram illustrating an example of a network apparatus in a mobile P2P environment.

FIG. 2 illustrates an example of a network apparatus in a mobile P2P environment. For convenience, the network apparatus of FIG. 2 is referred to as the proxy 100 of FIG. 1.

Referring to FIG. 2, the network apparatus 100 includes a movement sensing unit 110, a candidate proxy selection unit 130, a data packet forwarding unit 150, and an information control unit 170. In FIG. 2, it is assumed that a data packet is shared between the mobile peer 200 and the proxy 100, and among the proxy 100 and the CPs 400, which are each illustrated in FIG. 1.

The movement sensing unit 110 may sense movement of the mobile peer 200 based on a location of the mobile peer 200.

For example, the movement sensing unit 110 may sense the movement of the mobile peer 200 by receiving information about a change of an IP address of the mobile peer 200, a change of a network interface to which the mobile peer 200 belongs, whether handover occurs in the mobile peer 200, and the like.

When the IP address is changed, the movement sensing unit 110 may receive information about the changed IP address from the mobile peer 200, and may use the information to sense the movement of the mobile peer 200.

When the handover occurs, the movement sensing unit 110 may receive information about the changed location of the mobile peer 200 from the mobile peer 200, and may use the information to sense the movement of the mobile peer 200.

When the network interface is changed, the movement sensing unit 110 may receive information about the changed heterogeneous network interface from the mobile peer 200, and may use the information to sense the movement of the mobile peer 200.

The candidate proxy selection unit 130 may determine whether to change the proxy 100 of the mobile peer 200, based on the movement sensed by the movement sensing unit 110.

When the movement sensing unit 110 senses that the mobile peer 200 moves, the candidate proxy selection unit 130 may select a candidate proxy to which to transfer the mobile peer 200.

For example, referring to FIG. 1, the candidate proxy selection unit 130 may select any one of the neighbor proxies 300 as the candidate proxy, based on state information of each of the neighbor proxies 300, and/or the location of the mobile peer 200. The neighbor proxies 300 are neighboring the proxy 100. To keep information of the neighbor proxies 300 updated, the proxy 100 and the neighbor proxies 300 may form a virtual network, and periodically exchange state information about each other. For example, the state information may include IP address information of a neighbor proxy and resource consumption level information.

The candidate proxy selection unit 130 may select a plurality of candidate proxies with a higher priority from the plurality of neighbor proxies 300. In some embodiments, a candidate proxy with a highest priority may be selected as the optimal candidate proxy.

The candidate proxy selection unit 130 may select a neighbor proxy adjacent to the mobile peer 200 as the candidate proxy, based on the location of the mobile peer 200.

When it is sensed that the mobile peer 200 does not move, the candidate proxy selection unit 130 may determine whether to change a proxy of the mobile peer 200 based on a load that is to be processed by the proxy 100.

For example, when a buffer overflow or a network interface overhead occurs in the proxy 100, the candidate proxy selection unit 130 may determine to change the proxy of the mobile peer 200, and select a candidate proxy as a proxy to change the mobile peer 200 to.

When the candidate proxy is selected by the candidate proxy selection unit 130, the data packet forwarding unit 150 may forward a migration request message to the selected candidate proxy. For example, the migration request message may inquire whether to migrate the mobile peer 200, and include information about the mobile peer 200 and a correspondent peers (CP) list. The CP list may include, for example, IP address information of the CPs 400 where connection with the mobile peer 200 is set, and the information about the mobile peer 200 may include, for example, IP address information of the mobile peer 200.

When a confirm migration request message is received from the candidate proxy, the data packet forwarding unit 150 may forward IP address information of the candidate proxy 300 to the mobile peer 200. The confirm migration request message may confirm migration of the mobile peer 200. For example, the proxy 100 may forward the data packets, received from the CPs 400 connected to the mobile peer 200, to the selected candidate proxy.

When the neighbor proxy 300 of FIG. 1 is selected as the candidate proxy, the data packet forwarding unit 150 may receive the data packets, to be forwarded to the mobile peer 200, from the CPs 400, and forward the data packets to the candidate proxy 300. Accordingly, a tunnel through which the data packets are forwarded/received may be set between the candidate proxy 300 and the proxy 100.

When a message that rejects the migration of the mobile peer 200 is received, the data packet forwarding unit 150 may forward the confirm migration request message to a candidate proxy with the second highest priority or a candidate proxy which is reselected by the candidate proxy selection unit 130.

The data packet forwarding unit 150 may forward a proxy change request message to the mobile peer 200 illustrated in FIG. 1. The proxy change request message may require the current proxy 100 of the mobile peer 200 to be changed to the selected candidate proxy 300. In response, a confirm proxy change request message may be forwarded to the proxy 100. As described above, a data session between the mobile peer 200 and the candidate proxy 300 may be set through the forwarding of the proxy change request message.

After the data session is set between the mobile peer 200 and the candidate proxy 300, the data packets that were forwarded by the data packet forwarding unit 150 to the candidate proxy 300, may be forwarded to the mobile peer 200. Also, the data packet forwarding unit 150 may forward an endpoint change request message to the CPs 400. The endpoint change request message may request an endpoint change.

The information control unit 170 may delete information about the mobile peer 200 after the endpoint change request message is forwarded.

For example, when a finish (FIN) message is received from the CPs 400, after forwarding the endpoint change request message, the information control unit 170 may delete all profiles about the mobile peer 200, and release the data in a buffer that was used to forward the data packets to the mobile peer 200.

The FIN message may be a control message forwarded by a P2P application. The proxy 100 may exchange messages such as Transmission Control Protocol (TCP) FIN, and TCP FIN ACK, to release TCP connections with each of the CPs 400. Accordingly, data packets may be shared among the candidate proxy 300 and the CPs, and between the candidate proxy 300 and the mobile peer 200.

Figure 3:
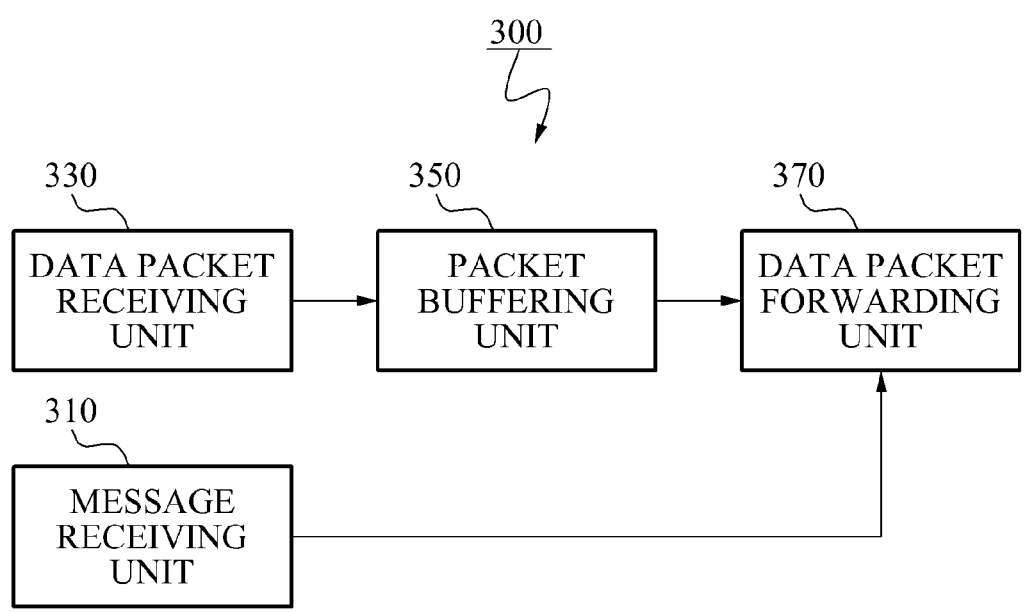
FIG. 3 is a diagram illustrating an example of a network apparatus that is selected as a candidate proxy in a mobile P2P environment.

FIG. 3 illustrates an example of a network apparatus that is selected as a candidate proxy in a mobile P2P environment. For convenience, the network apparatus of FIG. 3, is referred to as a candidate proxy.

Referring to FIG. 3, the candidate proxy 300 includes a message receiving unit 310, a data packet receiving unit 330, a packet buffering unit 350, and a data packet forwarding unit 370.

The message receiving unit 310 may receive a migration request message from the proxy 100 as shown in FIG. 1. The migration request message may inquire whether to migrate the mobile peer 200. In response, the message receiving unit 310 may forward a confirm migration request message that confirms the migration of the mobile peer 200 to the proxy 100. Also, a message that rejects the migration of the mobile peer 200 may be forwarded.

The message receiving unit 310 may receive a proxy registration request message from the mobile peer 200 illustrated in FIG. 1. In response, the message receiving unit 310 may forward, to the mobile peer 200, a confirm proxy registration request message that confirms the registration of the mobile peer 200. Accordingly, the mobile peer 200 may be registered in the candidate proxy 300 through the forwarding/receiving of the proxy registration request message and the confirm proxy registration request message. Also, a data session may be set between the mobile peer 200 and the candidate proxy 300.

The data packet receiving unit 330 may receive data packets for the mobile peer 200, from the proxy 100 which is the proxy of the mobile peer 200. For example, the data packets may include data packets to be forwarded to the mobile peer 200 from the CPs 400 illustrated in FIG. 1.

The packet buffering unit 350 may buffer the received data packets for the mobile peer 200.

Because the mobile peer 200 is registered in the candidate proxy 300, the data packets may be shared between the candidate proxy 300 and the mobile peer 200, and among the candidate proxy 300 and the CPs 400.

When the mobile peer 200 is registered in the candidate proxy 300, the data packet forwarding unit 370 may forward the data packets that are buffered in the packet buffering unit 350, to the mobile peer 200.

Figure 4:
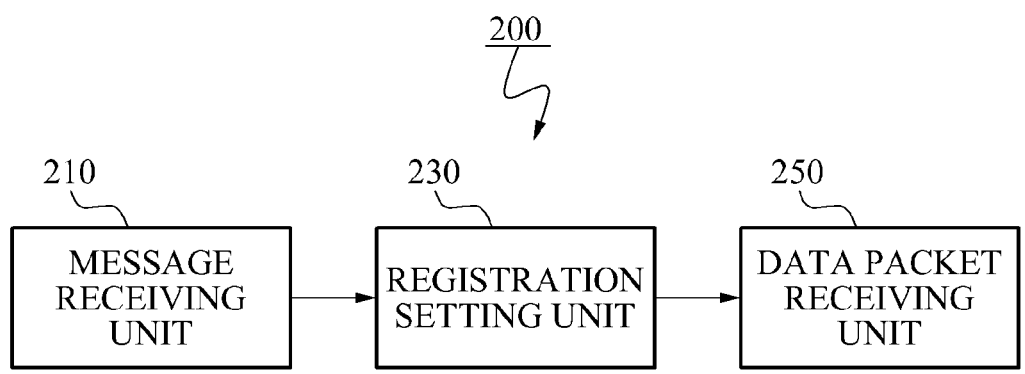
FIG. 4 is a diagram illustrating an example of a network apparatus that is connected to a proxy in a mobile P2P environment.

FIG. 4 illustrates an example of a network apparatus that is connected to a proxy in a mobile P2P environment. The network apparatus may be referred to as the mobile peer 200 for convenience of description with reference to FIG. 4.

Referring to FIG. 4, the mobile peer 200 includes a message receiving unit 210, a registration setting unit 230, and a data packet receiving unit 250.

The message receiving unit 210 may forward information about whether the mobile peer 200 moves, to the proxy 100.

For example, the message receiving unit 210 may forward the information that is used to sense the movement of the mobile peer 200. The information about whether the mobile peer 200 moves may include information about a change of an IP address of the mobile peer 200, a change of a network interface, whether a handover occurs, and the like.

The message receiving unit 210 may receive a proxy change request message from the proxy 100 of the mobile peer 200. The proxy change request message may request a proxy change of the mobile peer 200. In response, the message receiving unit 210 may forward a confirm proxy change request message to the proxy 100. For example, the proxy change request message may include IP address information of the candidate proxy 300 selected by the proxy 100.

Upon receipt of the proxy change request message, the registration setting unit 230 may forward a proxy registration request message to the candidate proxy 300. In response, the message receiving unit 210 may receive a confirm proxy registration request message from the candidate proxy 300. The confirm proxy registration request message may confirm registration of the mobile peer 200.

By confirming of the registration of the mobile peer 200, the registration setting unit 230 may register the mobile peer 200 in the candidate proxy 300. The data packets may be shared between the mobile peer 200 and the candidate proxy 300, and among the candidate proxy 300 and the CPs 400.

When the mobile peer 200 is registered in the candidate proxy 300, the data packet receiving unit 250 may receive data packets buffered in the candidate proxy 300.

Figure 5:
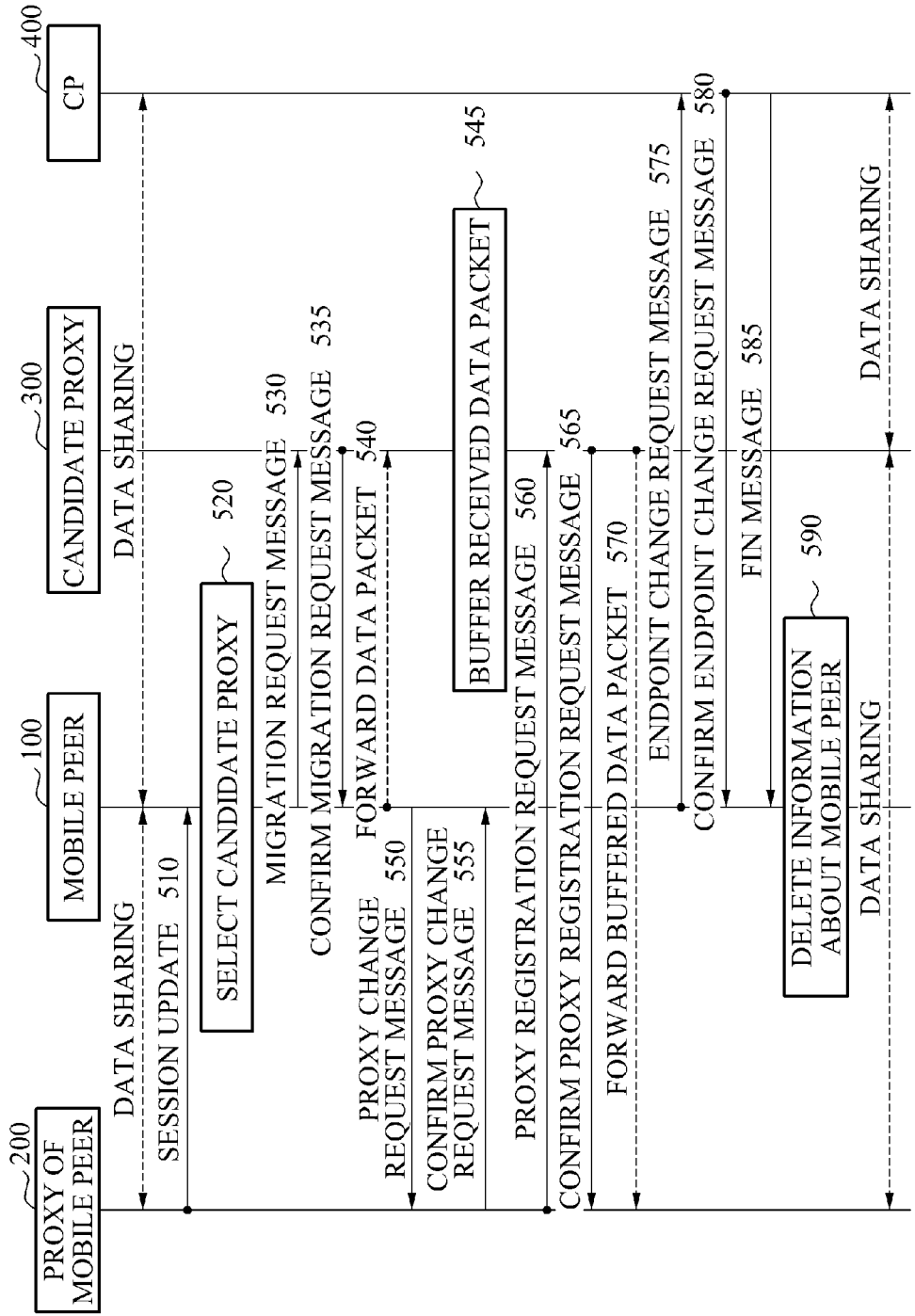
FIG. 5 is a diagram illustrating an example process of changing a proxy in a mobile P2P-based network system.

FIG. 5 illustrates an example process of changing a proxy in a mobile P2P-based network system. In this example, it is assumed that data packets are shared between the mobile peer 200 and the proxy 100, and among the proxy 100 and the CPs 400.

Referring to FIG. 5, in operation 510, the mobile peer 200 forwards information about whether the mobile peer 200 moves to the proxy 100, through the session update. For example, the proxy 100 may sense a change of an IP address of the mobile peer 200, a change of a network interface, or whether a handover occurs, through the session update.

In operation 520, when the movement of the mobile peer 200 is sensed, the proxy 100 selects any one of a plurality of neighbor proxies as the candidate proxy 300. In this example, the proxy 100 selects the candidate proxy 300 based on state information of each of the neighbor proxies. The state information may include IP address information and resource consumption level information of a neighbor proxy.

In operation 530, the proxy 100 may forward a migration request message to the candidate proxy 300. The migration request message may inquire whether to migrate the mobile peer 200. For example, the migration request message may include information about the mobile peer 200 and a CP list.

In operation 535, the candidate proxy 300 forwards a confirm migration request message that confirms the migration of the mobile peer 200 to the proxy 100.

In operation 540, the proxy 100 forwards data packets to the selected candidate proxy 300. The destination of the data packets may be the mobile peer 200. In operation 545, the candidate proxy 300 buffers the received data packets.

In operation 550, the proxy 100 forwards a proxy change request message to the mobile peer 200. The proxy change request message may request a proxy change of the mobile peer 200. In operation 555, the mobile peer 200 forwards a confirm proxy change request message to the proxy 100.

In operation 560, the mobile peer 200 forwards a proxy registration request message to the candidate proxy 300. The proxy registration request message may request registration of the mobile peer 200.

In operation 565, the candidate proxy 300 forwards a confirm proxy registration request message to the mobile peer 200. Through the forwarding of the confirm proxy registration request message to the mobile peer 200, the mobile peer 200 may be registered in the candidate proxy 300, and a data session may be set between the mobile peer 200 and the candidate proxy 300.

In operation 570, the candidate proxy 300 forwards the buffered data packets to the mobile peer 200.

In operation 575, the proxy 100 forward an endpoint change request message that requests an end change to the CPs 400. In operation 580, the proxy 100 receives a confirm endpoint change request message from the CPs 400.

In operation 585, the proxy 100 receives a FIN message from the CPs 400. For example, the FIN message may include a final data packet whose destination is the mobile peer 200.

In operation 590, when the FIN message is received, the proxy 100 deletes the information about the mobile peer 200. For example, the proxy 100 may delete profiles about the mobile peer 200, and release a buffer having been set used to forward the data packets to the mobile peer 200.

Through this process, the proxy 100 of the mobile peer 200 may be changed to the candidate proxy 300. Accordingly, the data packets may be shared between the candidate proxy 300 and the mobile peer 200, and among the candidate proxy 300 and the CPs 400.

Figure 6:
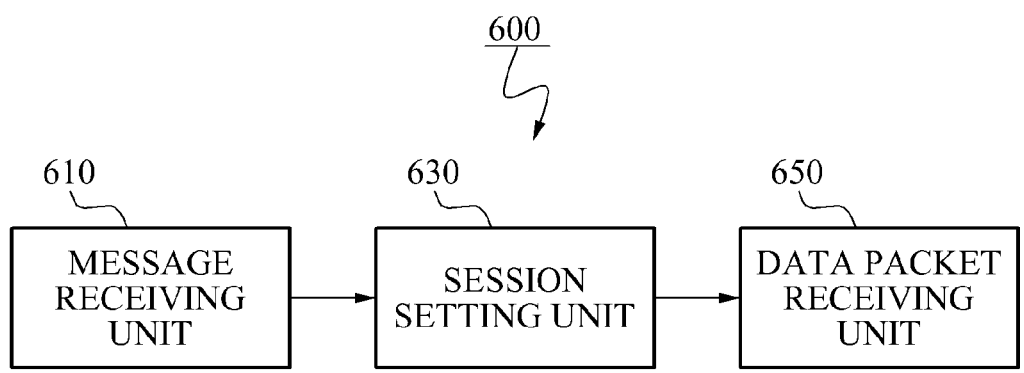
FIG. 6 is a diagram illustrating an example of a network apparatus that may set a data session.

FIG. 6 illustrates an example of a network apparatus that may set a data session. In the example shown in FIG. 6, the network apparatus is referred to as the candidate proxy 300.

Referring to FIG. 6, the candidate proxy 300 includes a message receiving unit 610, a session setting unit 630, and a data packet receiving unit 650.

Referring also to FIG. 1, the message receiving unit 610 may receive a migration request message from the proxy 100. In this example, the proxy 100 is the current proxy of the mobile peer 200.

Also, the message receiving unit 610 may receive a proxy registration request message that requests registration of the mobile peer 200, from the mobile peer 200.

When the proxy registration request message is received, and the mobile peer 200 is registered in the candidate proxy 300, the session setting unit 630 may set a data session among the CPs 400 and the candidate proxy 300. The CPs 400 may be connected to the mobile peer 200.

For example, the session setting unit 630 may forward a data session setup request message to the CPs 400. Also, the session setting unit 630 may receive a confirm data session setup message from the CPs 400. Accordingly, a data session may be set.

When the data session with the CPs 400 is set, the data packet receiving unit 650 may forward and receive data packets from and to the CPs 400 and the mobile peer 200.

FIG. 7 illustrates an example of a process of setting a data session among a candidate proxy and a CP.

In FIG. 7, in comparison to FIG. 5, a tunnel may be set between the proxy 100 and the candidate proxy 300, and the candidate proxy 300 may set a data session, without forwarding a data packet in operations 540, 545, and 570. The descriptions of operations 510, 520, 530, 535, 550, 555, 560, 565, 585, and 590 are omitted with reference to FIG. 7, because they are described herein with reference to FIG. 5.

In operation 710, when the mobile peer 200 is registered, and the candidate proxy 300 forwards a data session setup request message to the CPs 400 in order to set the data session with the CPs 400. For example, the data session setup request message may include profile information to terminate a connection among the proxy 100 and the CPs 400.

In operation 730, the candidate proxy 300 receives a confirm data session setup request message from the CPs 400. Through the receiving of the confirm data session setup request message from the CPs 400, the candidate proxy 300 may set the data session with the CPs 400.

In this example, each of the CPs 400 may forward a FIN message to the proxy 100, and terminate the data session among the proxy 100 and the CPs 400.

Also, the CPs 400 may forward data packets to the mobile peer 200 via the proxy 100 as well as the candidate proxy 300. In this example, a final destination of the data packet may be the mobile peer 200. Accordingly, loss of IN-flight packets that may be generated when changing the proxy 100 of the mobile peer 200 may be reduced.

Although the proxy 100 and the candidate proxy 300 are separately described for convenience of description, the operations of the proxy 100 and the operations of the candidate proxy 300 may be performed in a single proxy.

Also, although it has been described that the mobile peer 200 and the CPs 400 are used as a network apparatus sharing data, the mobile peer 200 may be an example of a mobile station (MS) that moves in a network system, and the CPs 400 may be an example of a communication terminal sharing data with the MS.

Accordingly, a data packet loss and a service disruption time that may occur during movement of an MS or load distribution may be reduced. A data packet may be prevented from being retransmitted and a network traffic load may be reduced. Also, a transmission distance between an MS and a proxy may be reduced, and a forward delay time of data packet may be reduced.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media may include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device, mobile station, or peer described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A peer-to-peer (P2P)-based network apparatus, the apparatus comprising:
    a movement sensing unit configured to sense movement of a mobile station (MS);
    a candidate proxy selection unit configured to select a candidate proxy server based on state information of each of neighbor proxy servers, in response to the movement of the MS being sensed; and
    a data packet forwarding unit configured to
        forward a migration request message to the candidate proxy server, the migration request message comprising an internet protocol (IP) address of the MS, and a correspondent peer (CP) list comprising an IP address of a CP device connected to the MS via a P2P connection through the apparatus, and
        forward a data packet destined for the MS to the selected candidate proxy server in response to a confirm migration request message being received from the candidate proxy server.

2. The P2P-based network apparatus of claim 1, wherein the movement sensing unit is configured to:
    sense the movement of the MS based on a location of the MS.

3. The P2P-based network apparatus of claim 1, wherein the movement sensing unit is configured to:
    sense the movement of the MS based on a change of an IP address of the MS, or a change of a network interface, or whether a handover occurs, or any combination thereof.

4. The P2P-based network apparatus of claim 1, wherein the data packet forwarding unit is further configured to:
    set a tunnel with the candidate proxy server.

5. The P2P-based network apparatus of claim 4, wherein the data packet forwarding unit is further configured to:
    forward an IP address of the candidate proxy server to the MS, in response to the confirm migration request message being received.

6. The P2P-based network apparatus of claim 1, wherein:
the data packet forwarding unit is further configured to forward a proxy change request message to the MS; and
a data session between the MS and the candidate proxy server is set through the forwarding of the proxy change request message.

7. The P2P-based network apparatus of claim 6, wherein the candidate proxy server is configured to forward, to the MS, the data packet that was previously-forwarded to the candidate proxy server, in response to the data session between the MS and the candidate proxy server being set.

8. The P2P-based network apparatus of claim 6, wherein the data packet forwarding unit is further configured to:
forward an endpoint change request message to the CP device connected to the MS, in response to the data session between the MS and the candidate proxy server being set.

9. The P2P-based network apparatus of claim 1, wherein the data packet forwarding unit is further configured to:
receive and forward the data packet from and to the MS and the CP device connected to the MS; and
share the data packet with the MS and the CP device.

10. The P2P-based network apparatus of claim 8, the apparatus further comprising:
an information control unit configured to delete information of the MS after the data packet is forwarded.

11. The P2P-based network apparatus of claim 10, wherein the information control unit is further configured to:
receive a finish (FIN) message from the CP device connected to the MS, in response to the endpoint change request message being forwarded to the CP device; and
delete the information of the MS, and release data in a buffer used to forward data packets to the MS, in response to the FIN message being received.

12. The P2P-based network apparatus of claim 1, wherein:
the state information of each of the neighbor proxy servers comprises an IP address and a resource consumption level; and
the candidate proxy selection unit is configured to select the candidate proxy server with a highest priority among the neighbor proxy servers.

13. A peer-to-peer (P2P)-based network apparatus, the apparatus comprising:
a message receiving unit configured to
receive a migration request message from a proxy server, the proxy server selecting a candidate proxy server based on state information of each of neighbor proxy servers, in response to movement of a mobile station (MS) being sensed, and the migration request message comprising an internet protocol (IP) address of the MS, and a correspondent peer (CP) list comprising an IP address of a CP device connected to the MS via a P2P connection through the apparatus, and
receive a proxy registration request message from the MS to register the MS;
a data packet receiving unit configured to receive a data packet destined for the MS from the proxy server;
a packet buffering unit configured to buffer the received data packet; and
a data packet forwarding unit configured to forward the buffered data packet to the MS, in response to the MS being registered.

14. The P2P-based network apparatus of claim 13, wherein migration request message comprises information of the MS.

15. The P2P-based network apparatus of claim 13, wherein the data packet forwarding unit is further configured to:
share the data packet with the MS and the CP device connected to the MS.

16. A peer-to-peer (P2P)-based network apparatus, the apparatus comprising:
a message receiving unit configured to receive a proxy change request message from a proxy server configured to sense movement of a mobile station (MS), select a candidate proxy server based on state information of each of neighbor proxy servers, in response to the movement of the MS, and forward a migration request message to the candidate proxy server, the migration request message comprising an internet protocol (IP) address of the MS, and a correspondent peer (CP) list comprising an IP address of a CP device connected to the MS via a P2P connection through the apparatus;
a registration setting unit configured to set a registration of the P2P-based network apparatus in the selected candidate proxy server; and
a data packet receiving unit configured to receive, from the selected candidate proxy server, a data packet, buffered in the selected candidate proxy server, in response to the registration being set.

17. The P2P-based network apparatus of claim 16, wherein the message receiving unit is further configured to:
forward, to the proxy server, information used to sense the movement of the MS.

18. The P2P-based network apparatus of claim 17, wherein the information comprises a change of the IP address of the MS, or a change of a network interface, or whether a handover occurs, or any combination thereof.

19. The P2P-based network apparatus of claim 16, wherein the registration setting unit is further configured to:
receive the proxy change request message; and
forward a proxy registration request message to the selected candidate proxy server.

20. A method of changing a proxy server in a mobile peer-to-peer (P2P)-based network, the method comprising:
selecting a candidate proxy server based on state information of each of neighbor proxy servers, in response to movement of a mobile station (MS);
forwarding a migration request message to the candidate proxy server, the migration request message comprising an internet protocol (IP) address of the MS, and a correspondent peer (CP) list comprising an IP address of a CP device connected to the MS via a P2P connection through the proxy server;
forwarding a data packet destined for the MS to the selected candidate proxy server in response to a confirm migration request message being received from the candidate proxy server; and
forwarding a proxy change request message to the MS.

21. The method of claim 20, the method further comprising:
forwarding an endpoint change request message that requests an end change to the CP device; and
deleting information of the MS in response to a finish (FIN) message being received.

22. A method of changing a proxy server in a mobile peer-to-peer (P2P)-based network, the method comprising:
receiving a migration request message from a proxy server, the proxy server selecting a candidate proxy server based on state information of each of neighbor proxy servers, in response to movement of a mobile station (MS) being sensed, and the migration request message comprising an internet protocol (IP) address of the MS, and a correspondent peer (CP) list comprising an IP address of a CP device connected to the MS via a P2P connection through the proxy server;

receiving a data packet destined for the MS from the proxy server;

buffering the received data packet; and forwarding the buffered data packet to the MS in response to a proxy registration request message from the MS being received.

* * * * *